United States Patent [19]
Corcoran

[11] Patent Number: 4,970,377
[45] Date of Patent: Nov. 13, 1990

[54] ODOMETER

[75] Inventor: Michael J. Corcoran, Liverpool, England

[73] Assignee: Delco Electronics Overseas Corporation, Detroit, Mich.

[21] Appl. No.: 473,491

[22] Filed: Feb. 1, 1990

[30] Foreign Application Priority Data

Feb. 4, 1989 [GB] United Kingdom ............... 8902536

[51] Int. Cl.⁵ ...................... G01C 21/00; G06C 15/42
[52] U.S. Cl. .................... 235/96; 235/139 R; 235/144 DM; 235/144 HC; 235/144 SP; 235/144 PN
[58] Field of Search .................. 235/95 R, 96, 117 A, 235/117 R, 139 R, 144 DM, 144 HC, 144 SM, 144 SP, 144 PN, 144 JP

[56] References Cited

U.S. PATENT DOCUMENTS

| | | | |
|---|---|---|---|
| 3,122,375 | 2/1964 | Krebsdzio | 235/144 HC |
| 3,598,309 | 8/1971 | Engier | 235/95 B |
| 4,314,149 | 2/1982 | Gomez | 235/96 |
| 4,362,927 | 12/1982 | Herrmann et al. | 235/139 R X |
| 4,572,945 | 2/1986 | Branchi | 235/144 SP |

Primary Examiner—Benjamin R. Fuller
Attorney, Agent, or Firm—Ronald L. Phillips

[57] ABSTRACT

An odometer having a reset mechanism with a single spring that has a torsion section acting on the reset mechanism to bias pinions into engagement with the odometer wheels and a compression section for biasing the pinions into a predetermined axial position relative tot he odometer wheels.

8 Claims, 1 Drawing Sheet

ODOMETER

TECHNICAL FIELD

This invention relates to an odometer, and in particular to an arrangement for resetting an odometer to a predetermined reset position.

BACKGROUND OF THE INVENTION

It is common practice in a motor vehicle to provide two odometers, one of which gives a permanent reading of the distance traveled by the motor vehicle during its life, the other of which can give a reading for a specific journey. The latter odometer, therefore, has a reset mechanism which allows the odometer to be returned to zero before commencement of the journey. It is the latter type of odometer to which the present invention relates.

Such an odometer is well known, and an example is shown in U.S Pat. No. 4,314,149. In this example, separate springs are used to maintain the odometer wheels in a predetermined axial position (relative to the pinions), and to return the pinions into engagement with the odometer wheels after resetting to zero. In an alternative known arrangement, one of the springs acts on the pinions rather than the odometer wheels. The use of several springs in these known arrangements has disadvantages with regard to handling during assembly of the odometer, and cost.

SUMMARY OF THE INVENTION

It is an object of the present invention to overcome the above mentioned disadvantages.

To this end, an odometer in accordance with the present invention comprises a plurality of odometer wheels rotatable on a first shaft, each odometer wheel having teeth around the circumference of one side and at least one tooth (and preferably two teeth) positioned on the circumference of the other side; a shaped cam associated with each odometer wheel and rotatable therewith; a pinion positioned between adjacent odometer wheels and rotatable on a second shaft having an axis substantially parallel to that of the first shaft, the or each pinion having teeth around its periphery engageable with the at least one tooth of one odometer wheel and with the teeth of the adjacent odometer wheel; a reset mechanism pivotable about an axis substantially parallel to, and spaced from, the axis of the second shaft, the second shaft being mounted on the reset mechanism such that pivoting of the reset mechanism moves the or each pinion into and out of engagement with the odometer wheels, the reset mechanism comprising a finger associated with each shaped cam and engageable therewith to rotate the odometer wheels to a predetermined reset position on pivoting of the reset mechanism to move the or each pinion out of engagement with the odometer wheels; and a single spring having a torsion section acting on the reset mechanism to bias the or each pinion into engagement with the odometer wheels and a compression section for biasing the or each pinion into a predetermined axial position relative to the odometer wheels.

The present invention has the advantage that only a single spring is required.

Preferably, the compression section of the spring is provided by a helical portion. Alternatively, the compression section may be provided by a leaf spring arrangement.

The torsion section of the spring preferably comprises a first arm and a second arm, the first arm extending from one end of the compression section and having a free end fixed relative to the pivot axis of the reset mechanism, and the second arm extending from the other end of the compression section and having a free end in engagement with the second shaft.

Preferably, the reset mechanism comprises a swinging member which is pivotable about the pivot axis and which defines the fingers, and a sliding member, the second shaft being mounted on arms of the swinging member with the pinions positioned between the arms. In this case, the compression section of the spring preferably acts on the arms to maintain the pinions in the predetermined axial position. The swinging member preferably comprises another arm engageable in a groove in the sliding member such that sliding movement of the sliding member pivots the swinging member about the pivot axis. Alternatively, the groove may be in the swinging member, and the engageable arm on the sliding member.

The shaped cams are preferably heart shaped.

Preferably a drive pinion is also rotatably mounted on the second shaft for providing drive for the odometer.

BRIEF DESCRIPTION OF THE DRAWINGS

The present invention will now be described, by way of example, with reference to the accompanying drawings, in which.

Figure 1:
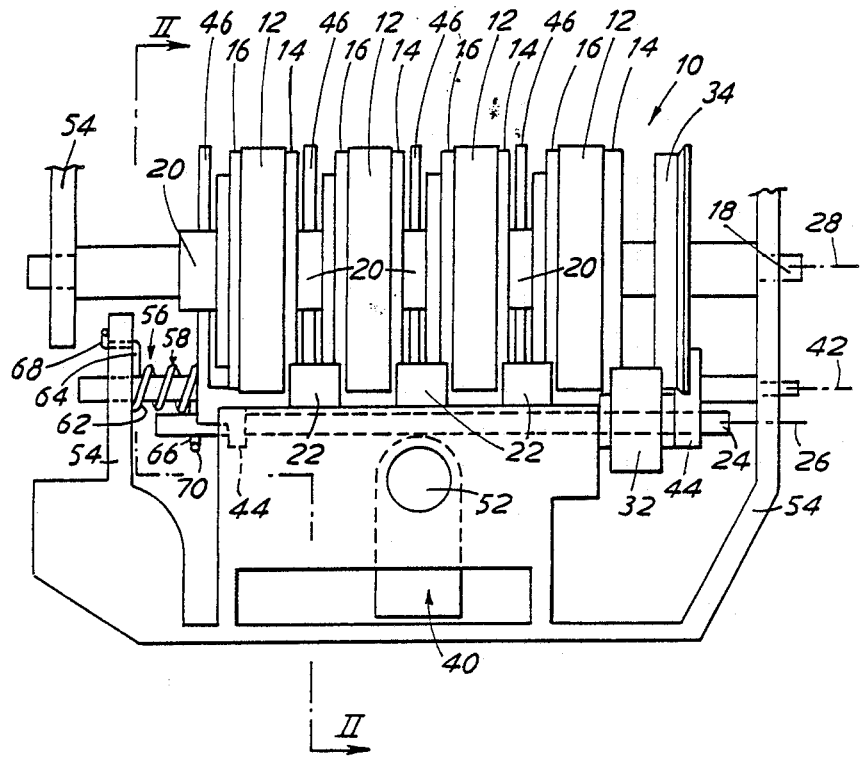
FIG. 1 is a side view of an odometer in accordance with invention.

FIG. is a cross-sectional view on the line II—II of FIG. 1.

DETAILED DESCRIPTION OF THE INVENTION

Referring to the drawings, an odometer 10 for a motor vehicle comprises four odometer wheels 12 having numerals (not shown) 0 to 9 printed around the periphery thereof. Each odometer wheel 12 has, on one side 14, a series of teeth (not shown) around its circumference, and on the other side 16, two teeth (not shown) positioned on the periphery thereof, and which coincide with two of the teeth in the series of teeth on the one side 14. The odometer wheels 12 are rotatably mounted on a first shaft 18, but fixed in an axial direction. A heart-shaped cam 20 is associated with each odometer wheel 12 and rotates therewith.

Positioned between adjacent odometer wheels 12 are pinions 22 which are rotatably mounted on a second shaft 24. The axis 26 of the second shaft 24 is substantially parallel to the axis 28 of the first shaft 18. The pinions 22 have teeth 30 around their periphery which engage the series of teeth on the one side 14 of an odometer wheel 12, and which are engageable with the two teeth on the other side 16 of the adjacent odometer wheel 12. This arrangement is such that when the first odometer wheel 12 (which is furthest right as viewed in FIG. 1) completes a full revolution, the two teeth on the other side 16 thereof engages the teeth 30 on the adjacent pinion 22 to rotate the pinion, which in turn rotates the second odometer wheel (which is adjacent the first odometer wheel) through 36 degrees due to the engagement of the teeth 30 on the pinion with the series of teeth on the one side 14 of the second odometer wheel. The number and spacing of the teeth 30 on the pinions 22 and of the series of teeth on the one side 14 of the odometer wheels 12 is predetermined to ensure rotation through 36 degrees. Similarly, full rotation of the second odometer wheel 12 causes the third odometer wheel to rotate through 36 degrees, and full rotation of the third odometer wheel 12 causes the fourth odometer wheel (which is furthest left as viewed in FIG. 1) to rotate through 36 degrees.

Drive means are provided for rotating the first odometer wheel 12. The drive means comprises a drive pinion 32 and a drive gear 34. The drive pinion 32 is rotatably mounted on the second shaft 24, and the drive gear 34 is rotatably mounted on the first shaft 18. Teeth (not shown) on the circumference of the drive gear 34 engage teeth (not shown) on the circumference of the drive pinion 32, and the teeth on the drive pinion 32 also engage the series of teeth on the one side 14 of the first odometer wheel 12. Rotation of the drive gear 34 therefore causes rotation of the first odometer wheel 12. The drive gear 34 is rotatably driven by a suitable connection to the transmission of the motor vehicle in the usual known manner.

In order for the odometer 10 to operate properly, the pinions 22 and the drive pinion 32 must be maintained in a predetermined axial position relative to the odometer wheels 12.

The odometer 10 also includes a reset mechanism 36 which comprises a swinging member 38 and a sliding member 40. The swinging member 38 is pivotable about an axis 42 substantially parallel to, and spaced from, the axes 26, 28 of the second and first shafts 24, 18 respectively. The second shaft 24 is mounted on arms 44 of the swinging member 38 of the reset mechanism 36 such that its axis 26 can pivot about the axis 42. The pinions 22 and the drive pinion 32 are mounted on the second shaft 24 between the arms 44. The swinging member 38 also comprises fingers 46 directed away from the axis 42, each finger being associated with one of the heart-shaped cams 20; and another arm 48 directed away from the axis 42 in substantially the opposite direction to the fingers 46. The other arm 48 is engaged in a groove 50 in the sliding member 40. The sliding member 40 can slide in the direction X on pushing a button 52 attached thereto.

The odometer 10 is mounted in a suitable housing 54 such that the first shaft 18 and the pivot axis 42 of the swinging member 38 are fixed relative to the housing.

A single spring 56 is secured to the housing 54 at one end of the swinging member 38 of the reset mechanism 36. The spring 56 comprises a compression section 58 and a torsion section 60. The compression section 58 is defined by a helical portion 62 which surrounds the pivot axis 42 and which is positioned between the housing 54 and the swinging member 38. The torsion section 60 is defined by first and second arms 64, 66. The first arm 64 extends from one end of the helical portion 62 and is fixed at its free end 68 to the housing 54. The second arm 66 extends from the other end of the helical portion 62 and its free end 70 engages the second shaft 24. The resilient bias provided by the compression section 58 acts on the arms 44 of the swinging member 38, and hence on the pinions 22 and the drive pinion 32 to maintain the pinions in the predetermined axial position relative to the odometer wheels 12. The resilient bias provided by the torsion section 60 acts on the second shaft 24 to maintain the teeth 30 on the pinions 22 and on the drive pinion 32 in engagement with the series of teeth on the one side 14 of the odometer wheels 12.

Figure 2:
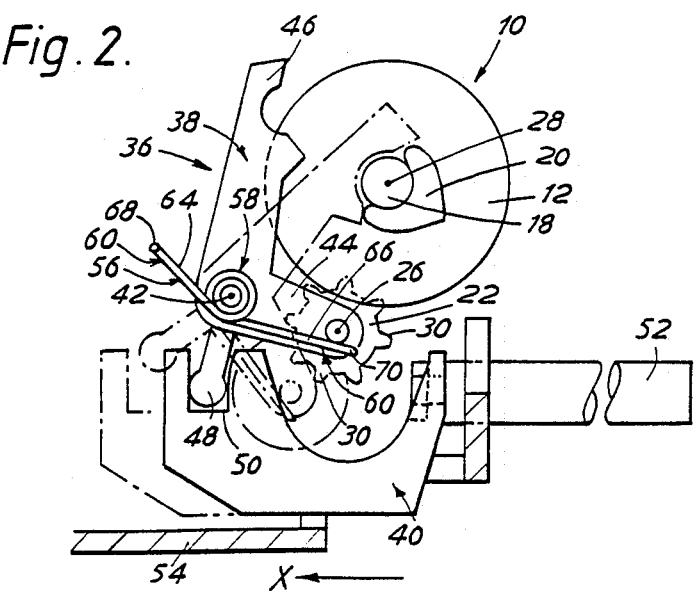

The reset mechanism 36 is actuated by pushing the button 52 in the direction X. This causes the sliding member 40 to also move in the direction X and, due to the engagement of the other arm 48 in the groove 50, causes the swinging member 38 to pivot about the axis 42 against the bias of the torsion section 60 of the spring 56. This pivoting action of the swinging member 38 moves the pinions 22 and the drive pinion 32 out of engagement with the odometer wheels 12 and also moves each finger 46 into engagement with its associated heart-shaped cam 20. This latter engagement rotates the heart-shaped cam 20, and hence the associated odometer wheel 12, to a predetermined rotational (reset) position relative to the first shaft 18 (in normal circumstances, this is to reset the odometer 10 to read zero). The position of the swinging member 38 and the sliding member 40 at this reset position is shown in ghosted outline in FIG. 2. On release of the button 52, the bias of the torsion section 60 of the spring 56 acts on the second shaft 24, and hence on the swinging member 38, to return the swinging member 38 and the sliding member 40 (by way of the other arm 48 in the groove 50) to their original positions. This action moves the pinions 22 and the drive pinion 32 back into engagement with the odometer wheels 12.

It will be apparent from the above that only a single spring 56 is required to maintain the teeth 30 on the pinions 22 and the drive pinion 32 in engagement with the series of teeth on the one side 14 of the odometer wheels 12, and to maintain the pinions and the drive pinion in the predetermined axial position relative to the odometer wheels. This has considerable advantages over the previously known arrangements with regard to both cost of parts and assembly time.

The shape of the cam 20 need not be heart-shaped. The actual form is developed from the shape of the finger 46 of the reset mechanism 36 to give a low force action on resetting.

The embodiments of the invention in which an exclusive property or privilege is claimed are defined as follows:

1. An odometer comprising a plurality of odometer wheels rotatable on a first shaft, each odometer wheel having teeth around the circumference of one side and at least one tooth positioned on the circumference of the other side; a cam associated with each odometer wheel and rotatable therewith; a pinion positioned between each pair of adjacent odometer wheels and rotatable on a second shaft having an axis substantially parallel to that of the first shaft, each pinion having teeth around a periphery thereof engageable with the at least one tooth of one odometer wheel and with the teeth of the adjacent odometer wheel; a reset mechanism pivotable about an axis substantially parallel to, and spaced from, the axis of the second shaft, the second shaft being mounted on the reset mechanism such that pivoting of the reset mechanism moves the pinions into and out of engagement with the associated odometer wheels, the reset mechanism comprising a finger associated with each shaped cam and engageable therewith to rotate the odometer wheels to a predetermined reset position on pivoting of the reset mechanism to move the pinions out of engagement with the associated odometer wheels; and a single spring having a torsion section acting on the reset mechanism to bias the pinions into engagement with the associated odometer wheels and a compression section for biasing the pinions into a predetermined axial position relative to the associated odometer wheels.

2. An odometer as claimed in claim 1, wherein the compression section of the spring is provided by a helical portion 3. An odometer as claimed in claim 1, wherein the torsion section of the spring comprises a first arm and a second arm, the first arm extending from one end of the compression section and having a free end fixed relative to the pivot axis of the reset mechanism, and the second arm extending from the other end of the compression section and having a free end in engagement with the second shaft.

4. An odometer as claimed in claim 1, wherein the reset mechanism comprises a swinging member which is pivotable about the pivot axis and which defines the fingers, the second shaft being mounted on arms of the swinging member with the pinions positioned between the arms.

5. An odometer as claimed in claim 4, wherein the compression section of the spring acts on the arms to maintain the pinions in the predetermined axial position.

6. An odometer as claimed in claim 4 or claim 5, wherein the reset mechanism further comprises a sliding member slidable in a direction transverse to the pivot axis, and the swinging member comprises another arm engageable in a groove in the sliding member such that sliding movement of the sliding member pivots the swinging member about the pivot axis.

7. An odometer as claimed in claim 1, wherein the cams are heart shaped.

8. An odometer as claimed in claim 1, wherein a drive pinion is also rotatably mounted on the second shaft for providing drive for the odometer.

* * * * *